United States Patent
Crook et al.

[11] Patent Number: 6,072,055
[45] Date of Patent: Jun. 6, 2000

[54] ADHESION PROMOTERS AND METHODS OF THEIR SYNTHESIS AND USE

[75] Inventors: Russell A. Crook, South Ogden; Robert B. Wardle, Logan, both of Utah

[73] Assignee: Cordant Technologies Inc., Salt Lake City, Utah

[21] Appl. No.: 09/086,724

[22] Filed: May 29, 1998

Related U.S. Application Data

[63] Continuation of application No. 08/634,344, Apr. 18, 1996, which is a continuation-in-part of application No. 08/327,305, Oct. 21, 1994, Pat. No. 5,520,768, and application No. 08/550,957, Oct. 31, 1995, Pat. No. 5,660,884.
[60] Provisional application No. 60/011,884, Feb. 20, 1996.
[51] Int. Cl.⁷ .............................. C07D 231/00; C07F 7/10
[52] U.S. Cl. .................. 548/110; 427/327; 156/314; 156/281; 556/413
[58] Field of Search ................... 548/110; 427/327; 156/314, 281

[56] References Cited

U.S. PATENT DOCUMENTS

| | | | |
|---|---|---|---|
| 5,633,221 | 5/1997 | Fost et al. | 508/210 |
| 5,677,269 | 10/1997 | Fost et al. | 508/210 |
| 5,756,751 | 5/1998 | Schmalstieg et al. | 548/110 |

*Primary Examiner*—Paul F. Shaver
*Attorney, Agent, or Firm*—Pillsbury Madison & Sutro Intellectual Property Group

[57] ABSTRACT

The invention relates to a new class of alkoxy silane compounds of the following general formula:

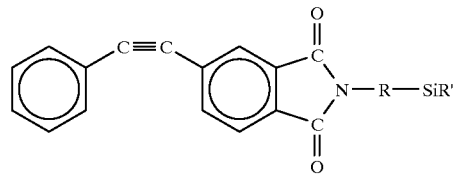

wherein R is aliphatic or aromatic having from 1 to about 15 carbon atoms and R' comprises a hydrolyzable alkoxy functionality. These compounds are particularly useful as adhesion promoters when used with adhesives such as, for example, phenylethynyl terminated polyamide or polysufide adhesives. The invention also relates to a method of synthesizing the alkoxy silane compounds defined above.

9 Claims, 6 Drawing Sheets

ADHESION PROMOTERS AND METHODS OF THEIR SYNTHESIS AND USE

RELATED APPLICATIONS

This is a continuation of U.S. patent application 08/634,344, filed Apr. 18, 1996, which is a continuation-in-part of U.S. patent application 08/550,957, filed Oct. 31, 1995 and entitled "Method of Surface Treatment of Titanium Substrates" (now U.S. Pat. No. 5,660,884), which is a conitinuation-in-part of U.S. patent application 08/327,305, filed Oct. 21, 1994 and entitled "Method of Surface Preparation of Aluminum Substrates" (now U.S. Pat. No. 5,520,768). Priority is claimed of each of the above-mentioned applications.

Additionally, priority is also claimed of U.S. provisional application 60/011,884, filed Feb. 20, 1996 and entitled "Method of Surface Preparation of Metal Substrates and For Synthesis of Adhesive Promoters" (now abandoned).

BACKGROUND

The Field of the Invention

The present invention is related to surface cleaning and preparation of metal substrates in order to provide improved bonding to those substrates. The present invention is further related to a new class of adhesion promoters, including specifically alkoxy silanes, and methods of synthesis of those materials.

Technical Background

In constructing various structures from metals it is important to have the capability of bonding to metal surfaces. This includes bonding metal surfaces to other metal surfaces, as well as bonding non-metal materials to metal surfaces. In many applications it is possible to use simple mechanical bonding mechanisms, such as bolts, screws, or rivets. In other applications, concerns over the added weight of mechanical fasteners make the use of adhesive more viable. Various adhesives are known and commonly used in the art of bonding metals together or bonding non-metal materials to metals. For example, various epoxy-based adhesives are widely used for these applications.

When metals are bonded using an adhesive it is generally important to provide the strongest possible bond. In the past it was difficult to assure a strong bond when using adhesive. For example, processing conditions during bond fabrication often cause dramatic reductions in bond strength.

Metal and metal alloys such as titanium, titanium alloys, steel, and steel alloys are generally considered difficult to bond to. Some metals, for example, have a propensity to form a weak hydrated surface layer of metal oxide. With these metals the surface morphology and hence, adhesive bond durability, is dependent upon the type of surface treatment received prior to bonding.

A widely used treatment for metal surfaces involves vapor degreasing and grit blasting. However, these methods do not provide sufficient initial bond strength or bond durability for adhesives such as phenylethynyl terminated polyimides as evidenced by significant metal interfacial failure. Therefore, the bondline properties are very sensitive to the relative humidity and process times from surface preparation to bonding. Moisture can also penetrate the bondline during aging, resulting in degradation of bondline properties and interfacial failures.

Available cleaning solvents used in this process have become more restrictive because of environmental regulation on chemical waste disposal. Thus, the combination of process sensitivity, marginal bond durability, and environmental constraints, raises concerns over continued use of traditional surface treatment processes.

There are limited alternative methods of metal surface treatment and preparation. Some of these other methods of metal surface preparation involve formation of stable, moisture-resistant oxide layers. These methods include sulfuric, chromic, and phosphoric acid anodization. These electrolytic processes inhibit the further growth of corrosion surface layers and enhance initial bond strength and bond durability. In addition, the phosphoric acid process produces a honeycomb surface which is believed to enhance bond strength through mechanical interlocking.

These processes, however, generally consist of a complex series of treatments including degreasing, alkaline cleaning, acid etching, acid anodization, and in some instances, a post treatment process including primers and coatings. These processes use heavy metals, acids, caustics and other hazardous and toxic chemicals which pose handling and disposal problems. Clearly, environmental constraints limit the usefulness of these traditional surface treatment processes.

Accordingly, what is needed in the art are effective and efficient methods of surface preparation and treatment of titanium, steel, and other metals, in order to provide stable adhesive bonding to metal substrates. In that regard it would be a significant advancement in the art to provide methods of surface treatment and preparation which were relatively simple, and which used readily available materials. It would be a related advancement in the art to provide such methods which employed materials that did not present a significant environmental hazard. It would be an advancement in the art to provide improved materials which promote adhesion. It has been discovered, as discussed below, that materials such as 4-phenylethylnl-N [3-triethoxysilylpropyl] phthalimide can be employed to promote adhesion. It would also be a significant advancement in the art to provide improvement methods of synthesizing this material for use as an adhesion promoter.

Such methods are disclosed and claimed herein.

BRIEF SUMMARY AND OBJECTS OF THE INVENTION

The present invention relates to a new class of compounds that are particularly adaptable for use as adhesion promoters. These materials include a new group of phenylethynyl terminated silanes. The present invention is also related to methods of synthesizing these compounds. These materials are useful, upon hydrolysis of the ethoxy functionalities, for adhesion promotion when applied to metal surfaces with, for example, phenylethynyl terminated polyamide or polysulfide adhesives.

In one aspect, the present invention is related to the preparation and synthesis of the phenylethynyl terminated silanes of the present invention. One example of such a material is 4-phenylethylnl-N [3-triethoxysilylpropyl] phthalimide. Because of the highly conjugated structure of the compound it fluoresces, making its detection and inspection on the metal surface easy. The material is a clear yellow viscous liquid.

These materials are synthesized and used by employing a two-step procedure. In the case of the specific material mentioned above, the first step involves the reaction of 4 phenylethynyl phthalic anhydride with 3 aminopropyl triethoxy silane to yield 3-(4-phenylethynyl phthalimide) propyltriethoxy (PEPI) silane. The second step hydrolyses the ethoxy groups enabling the silane to react with the metal oxides on the bond surface.

These effective adhesion promoters are useful with a number of adhesives. For example, materials within the scope of the present invention have been synthesized for use as adhesion promoters for a phenylethynyl terminated polyamide adhesive (commercially designated "LaRC-PETI V"). This resin has been incorporated into a commercially available film adhesive known as FMX-5 manufactured by CYTEC Industries.

DETAILED DESCRIPTION OF THE PREFERRED EMBODIMENTS

As mentioned above, the present invention is related to the synthesis of effective adhesion promoters. The materials within the scope of the invention comprise silanalkoxy compositions having the following general structure:

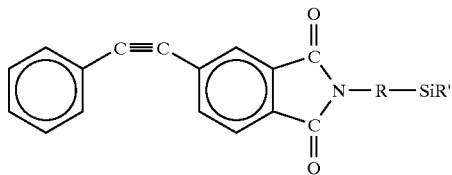

wherein R is aliphatic or aromatic having from 1 to 15 carbon atoms and R' is a hydrolyzable alkoxy functionality. In most applications, R will preferably contain 2 to 8 carbon atoms. One specific example of the compositions of the present invention is 4-phenylethylnl-N [3triethoxysilyipropyl] phthalimide wherein R is a propyl group.

The compositions within the scope of the present invention are prepare by a simple, but novel, synthesis. To prepare the compositions 4 phenylethynyl phthalic anhydride is reacted with the selected aminoalkoxy silane. One example of the a synthesis within the scope of the present invention is as follows:

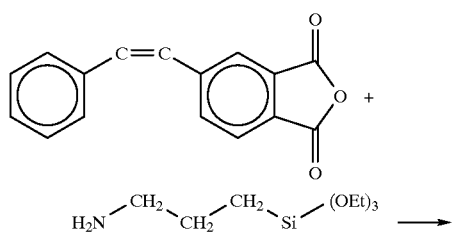

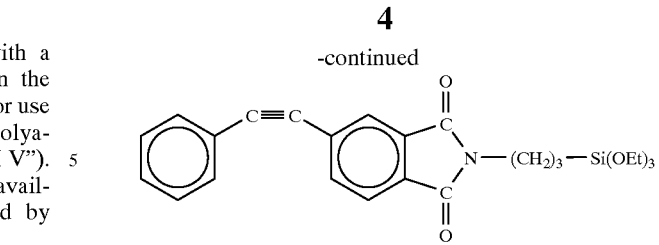

As mentioned above, these materials are useful compounds for adhesion promotion when applied to metal surfaces with, for example, phenylethynyl terminated polyamide and polysufide adhesives.

EXAMPLES

The following examples are given to illustrate various embodiments which have been made or may be made in accordance with the present invention. These examples are given by way of example only, and it is to be understood that the following examples are not comprehensive or exhaustive of the many types of embodiments of the present invention which can be prepared in accordance with the present invention.

Example 1

4-phenylethylnl-N [3-triethoxysilylpropyl] phthalimide was synthesized as follows. 4-phenylethynyl phthalic anhydride (PEPA) was added to a round bottom flask containing sufficient tetrahydrafuran (THF) to dissolve the PEPA. An equimolar amount of 3-aminopropytriethoxy silane (3-APS) was added to the mixture at room temperature. The mixture was then heated over a steam bath until the THF mixture began to boil (T=65° C.). The heating continued for approximately 5 minutes. The solution was then removed from the steam bath and allowed to cool. The solvent was removed using a rotovaporator at 40° C. The resulting product is a thick, viscous, yellow (amber) liquid.

Example 2

Figure 1:
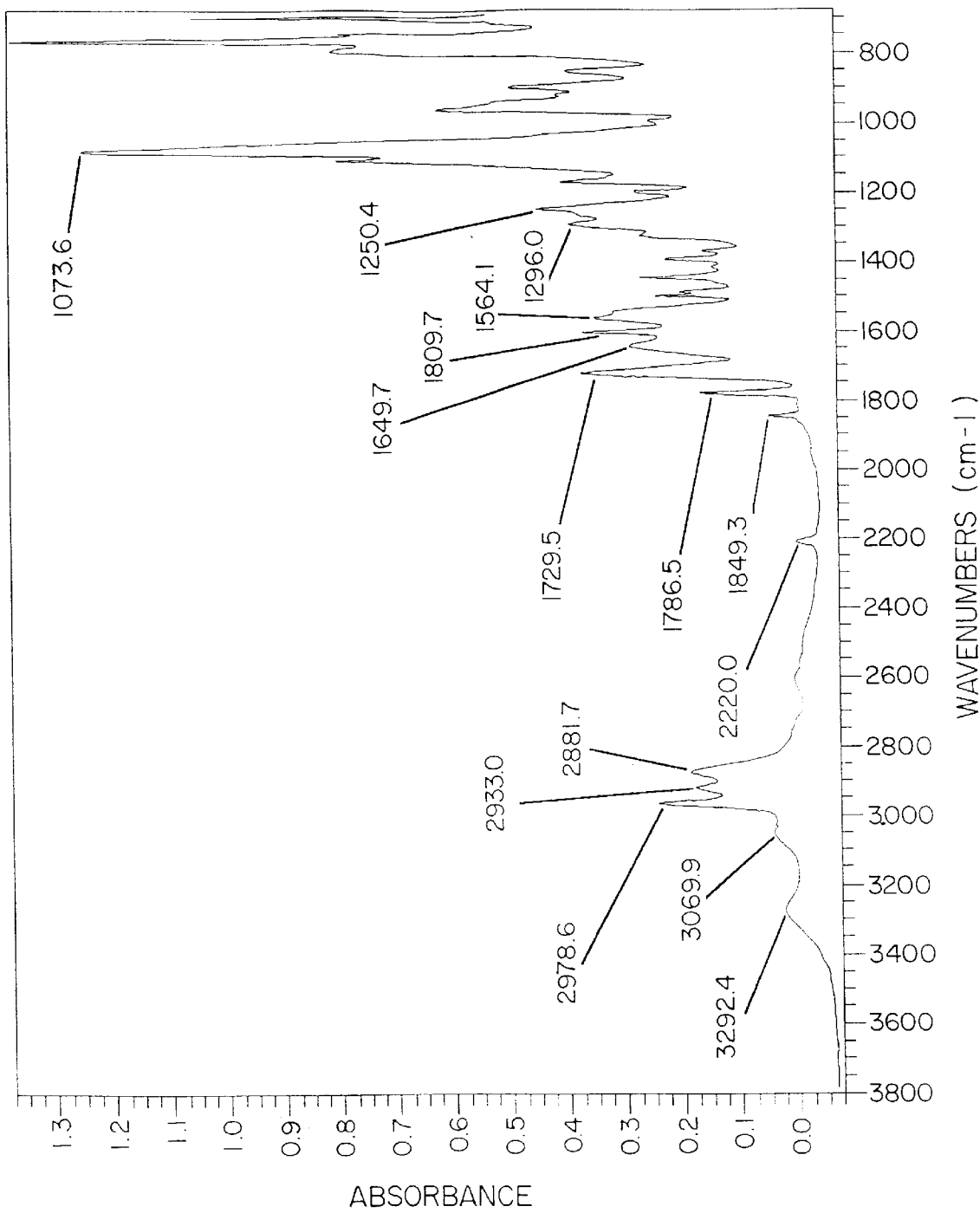
FIG. 1 is an IR spectrum of one composition within the scope of the present invention.
Figure 2:
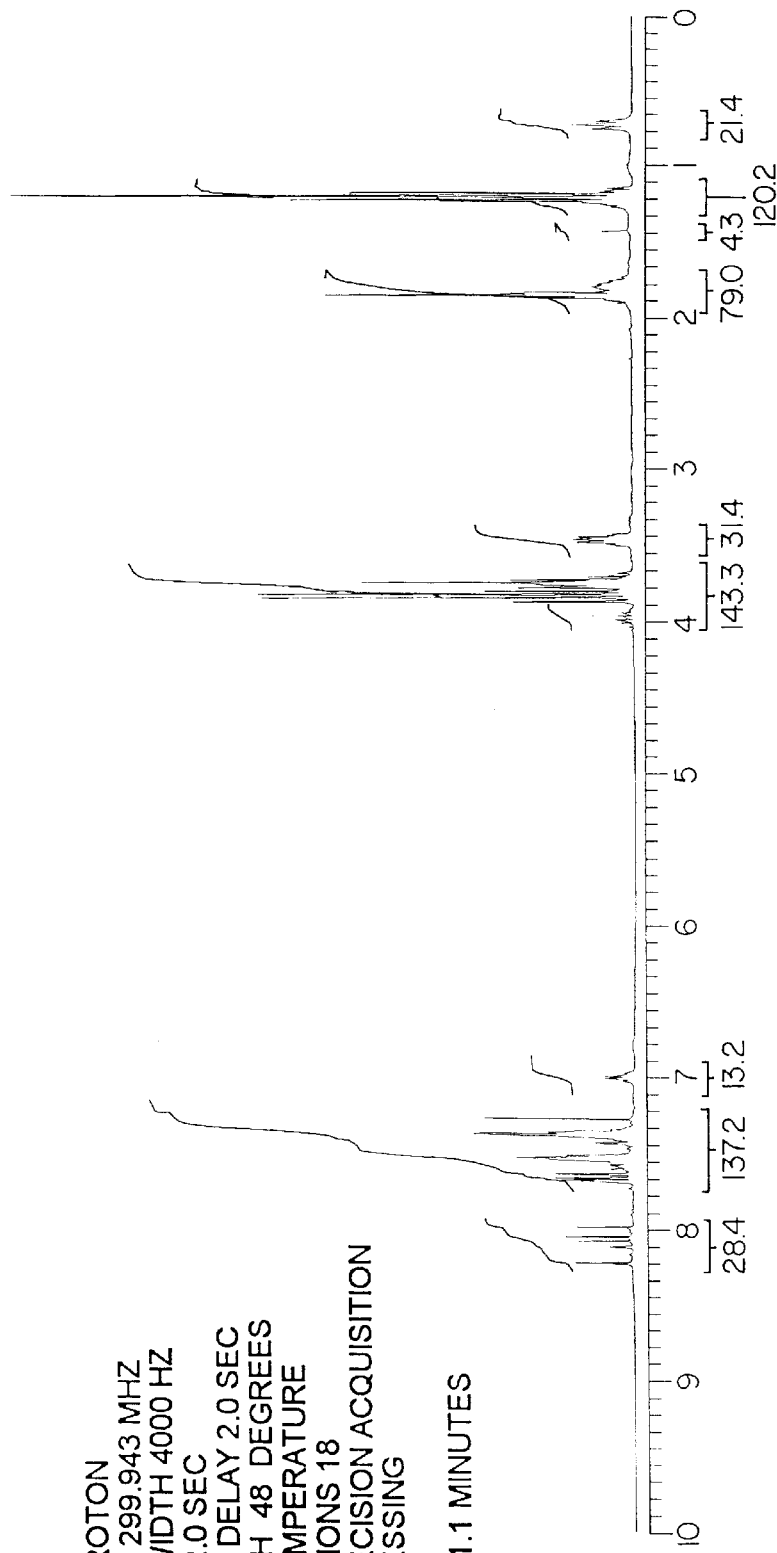
FIG. 2 is a proton NMR spectrum of the compound analyzed in FIG. 1.
Figure 3:
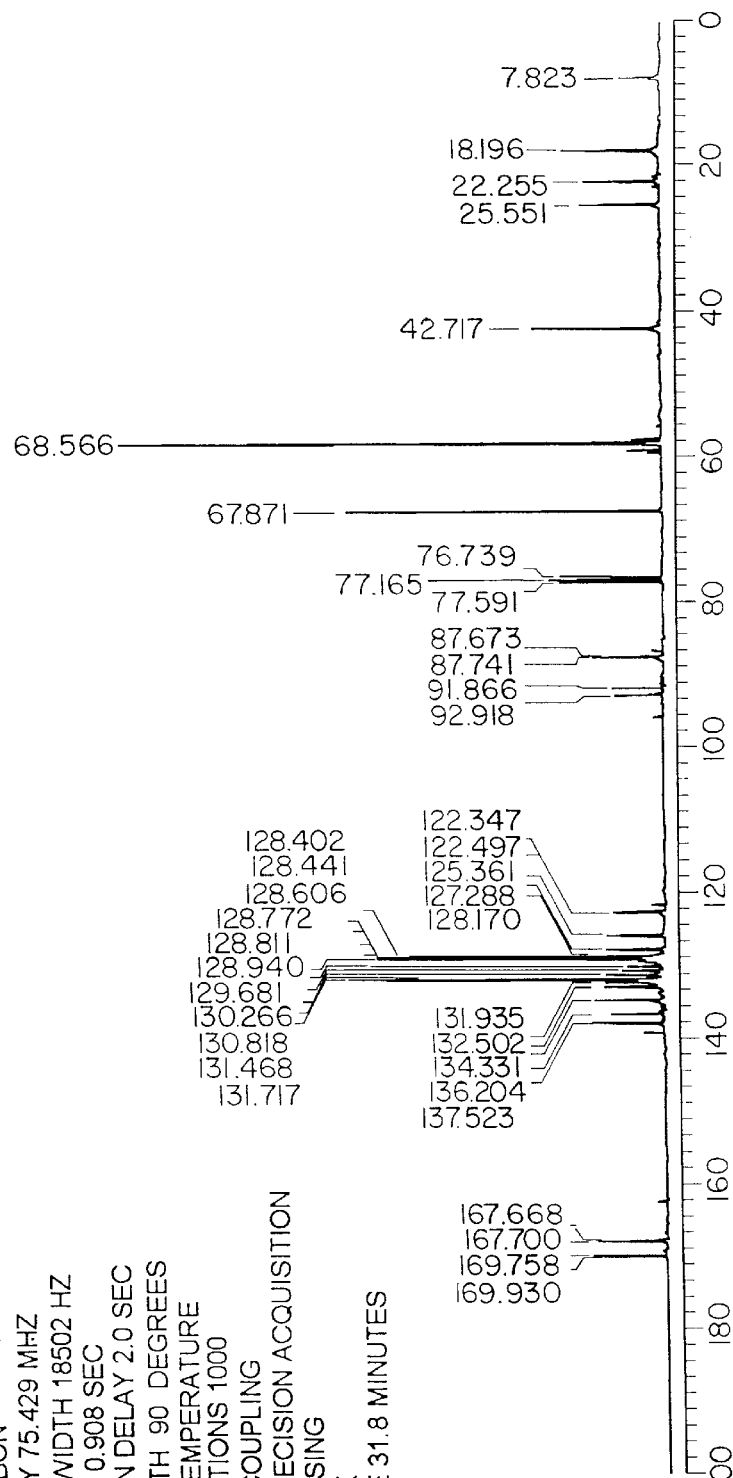
FIG. 3 is a $^{13}$C NMR spectrum of the compound analyzed in FIG. 1.

The compound synthesized accordingly to Example 1 was characterized using IR spectra. The IR spectra confirm the formation of the imide by the dual carbonyl stretching frequencies at 1787 and 1729 cm$^{-1}$ as shown in FIG. 1. The peak of 2220 cm$^{-1}$ is assigned to carbon triple bond carbon stretch. A small peak at 1850 cm$^{-1}$ has been assigned to the phthalic anhydride carbonyl stretching frequency. Proton NMR show no sign of hydrolyzed ethoxy functionality, as shown in FIG. 2, while the $^{13}$C NMR show evidence of —C≡C— adjacent to phenyl at 87 and 92 ppm and carbon ortho to —C≡C— at 122 ppm as illustrated in FIG. 3. The $^{13}$C also shows carbonyl adjacent to phenyl at 167 and 169 ppm. The two peaks may reflect the presence of both the amic acid and the imide.

Example 3

Next, a sodium acetate/acetic acid buffer system was created by adding 11 g sodium acetate trihydrate to distilled water followed by 2 milliliters of glacial acetic acid. The solution was diluted to 1 liter. This gives a pH of 5.0.

The PEPI silane was dissolved in THF and buffer solution was added to give a ratio of THF/buffer/PEPI silane of 13/6/1. If the mixture became cloudy, a small amount of the THF was added to dissolve the precipitate. The THF/buffer/PEPI solution was extracted in methyl chloroform to remove unreacted 4-PEPA and 3-APS. The THF phase was recovered and isolated using a rotovaporator at 40° C. for both 2 hours and ambient for 4 hours. The product recovered was a yellow crystalline powder. The melting point of the solid was approximately 152° C. This material is the polymeric form of the silane.

Figure 4:
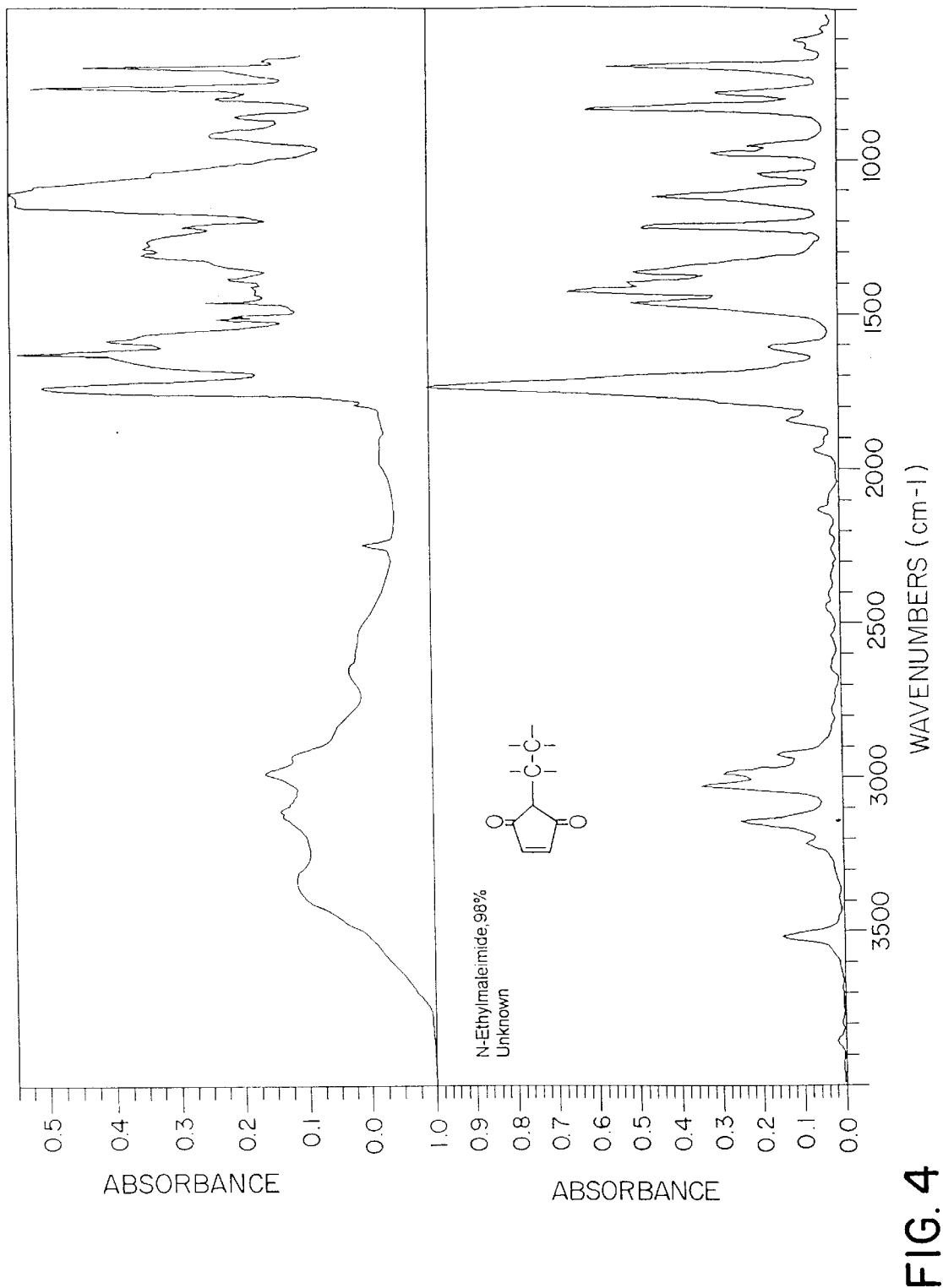
FIG. 4 is an IR spectrum of one composition within the scope of the present invention.
Figure 5:
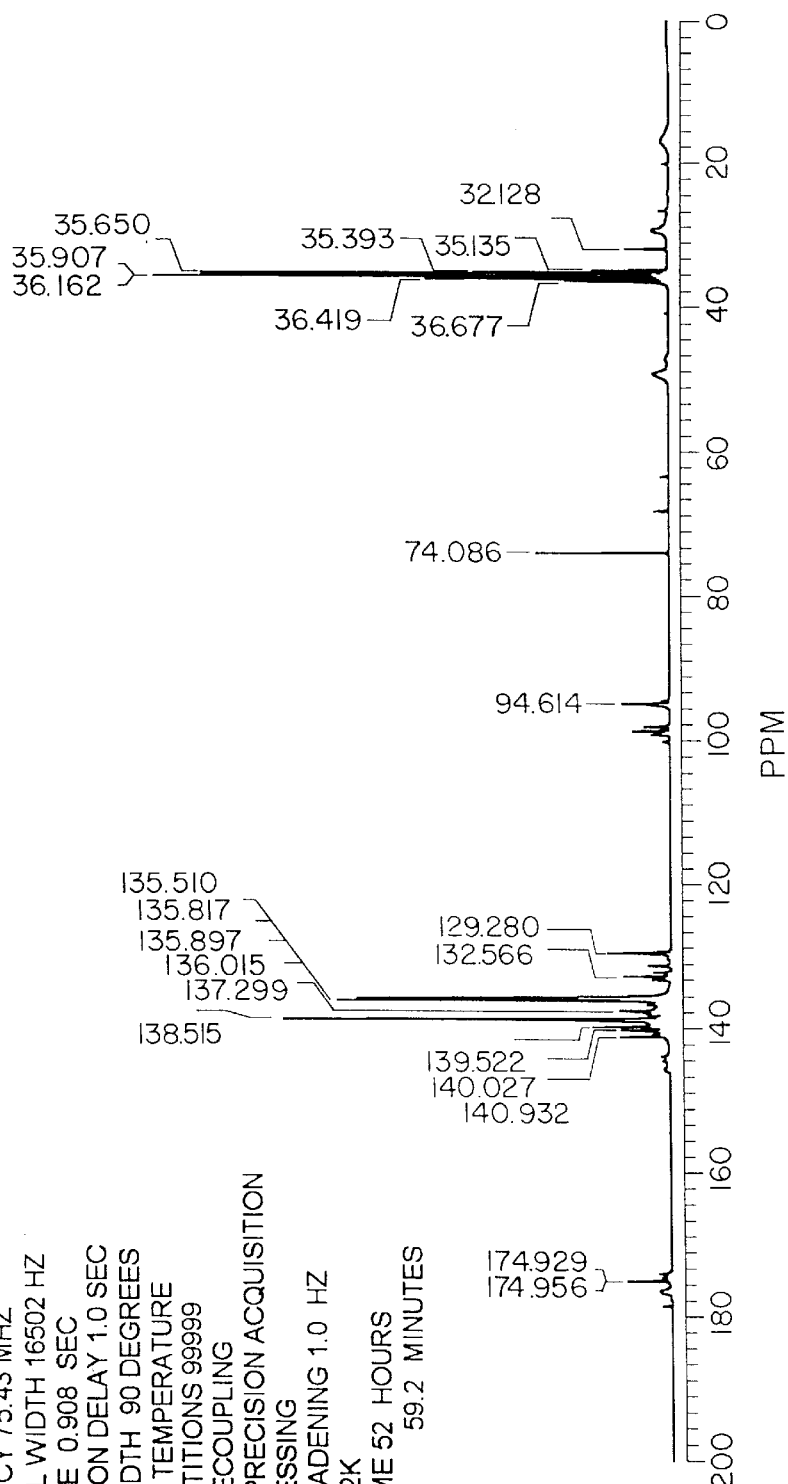
FIG. 5 is a $^{13}$C NMR spectrum of the compound analyzed in FIG. 4.
Figure 6:
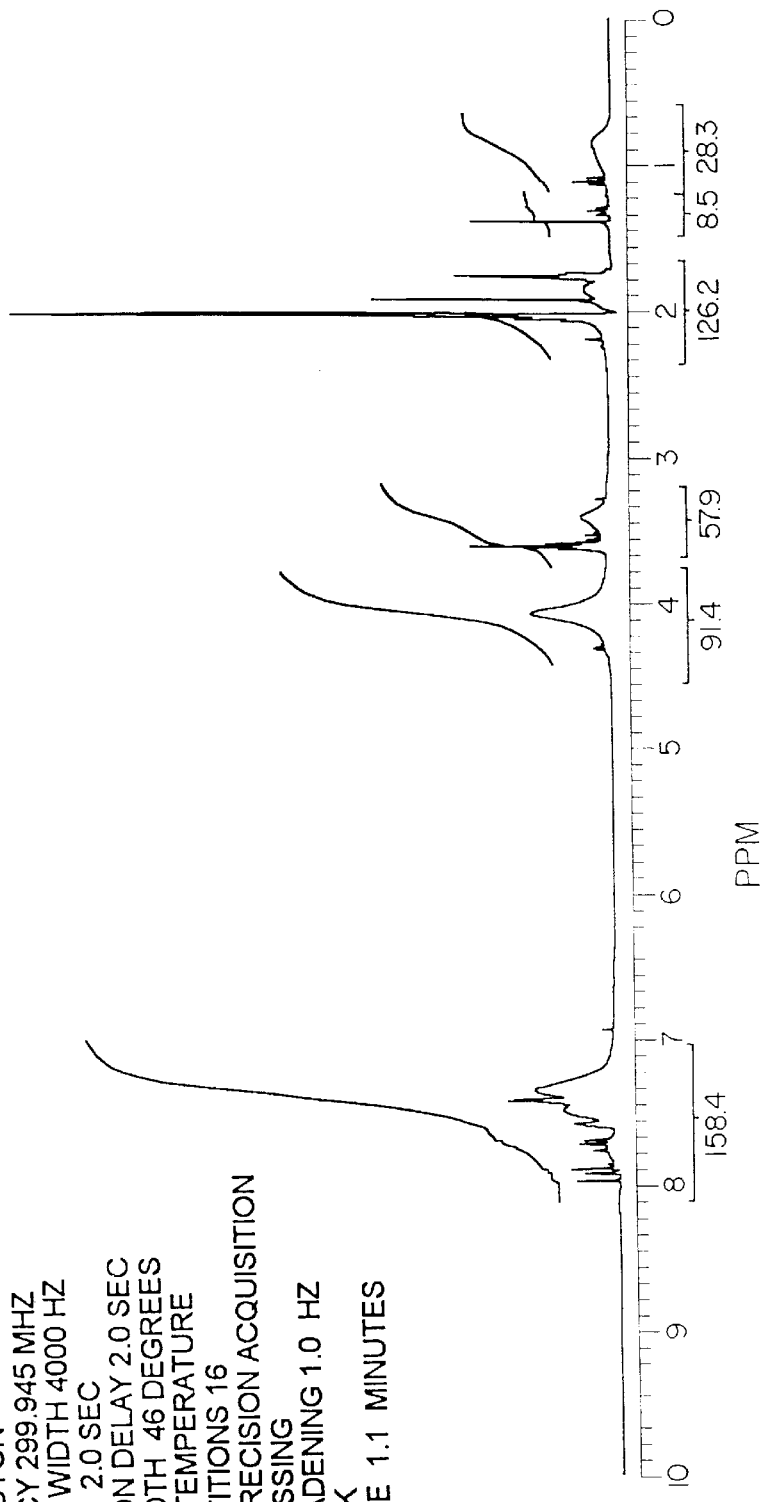
FIG. 6 is a proton NMR spectrum of the compound analyzed in FIG. 1.

IR spectra show the presence of the preservation of both the ethynyl and imide functionalities. Comparison of the experimental material with a model aliphatic imide (N-(4-bromobutyl) phthalimide show significant similarities (see FIG. 4). Some evidence exists for the presence of the amic acid. The $^{13}C$ NMR also shows the preservation of the imide and then ethynyl functionality (see FIG. 5). Proton NMR shows the presence of the —OH functionality at 4.1 ppm confirming the hydrolysis of the ethoxy functionality (see FIG. 6).

Example 4

The material prepared according to Examples 1–4 is an adhesion promoter. In addition, because of the extensive conjugated multiple bonds, the coating created by this material fluoresces with great efficiency, making its detection on the surface easy (FIG. 7.)

The material has been synthesized for use as an adhesion promoter for a phenylethynyl terminated polyamide adhesive (designated "LaRC-PETI V"). LaRC-PETI 5 is now manufactured as an experimental firm adhesive by Cytec Industries (manufactured as FMX-5).

Titanium lap shear panels were treated by first grit blasting to accomplish a vapor degreasing. The panels were then treated with a 0.2% sodium metasilicate solution, followed by 5% (wt./wt.) phenylethynyl terminated silane primer. The treated panels were then bond tested. All of the panels tested at room temperature failed at 3299 psi (5% solution) and 100% interfacial failure mode. Next a polyamic acid solution dissolved in N-methyl pyrrolidone (NMP) was added to the phenylethynyl terminated primed titanium lap shear panels, and then bonded. The results demonstrated a dramatic increase in the lap shear strength. These panels failed at an average lap shear strength of 7314 psi at room temperature and 4452 psi at 177° C. The failure mode was predominantly cohesive in the adhesive.

Further tests were performed to examine the relative contribution to bonding of the silane primer relative to that of the amic acid solution (one commercially available amic acid is designated BRX-5). Sample set 1 and 2 were vapor degreased and grit blasted, followed by a rinse with a 0.2% sodium metasilicate solution. Only sample set 2 was treated with a phenylethynyl terminated silane primer. Both sample sets were treated with the polyamic acid solution prior to bonding. Sample set 1 samples had an average lap shear strength of 4162 psi at room temperature and 3629 psi at 177° C. The average lap shear strength of samples in sample set 2 was 6793 psi at room temperature and 4264 psi at 177° C.

The data clearly indicates that the phenylethynyl terminated silane primer is playing a significant role in enhancing the adhesion of LaRC-PETI 5 to titanium and the hypothesis that 3-(4-phenyethynyl phthalimide) propyl ethoxy silane solution is an adhesion promoter.

SUMMARY

In summary the present invention provides improved methods of promoting adhesion to titanium, steel, and other metals. The present invention promotes adhesion with materials that do not present a recognized and regulated environmental hazard. The present invention also provides a simple yet effective method of synthesizing the compounds of the present invention.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by Letters Patent is:

1. A method for treating a metal surface comprising the step of applying to the surface a composition having the formula

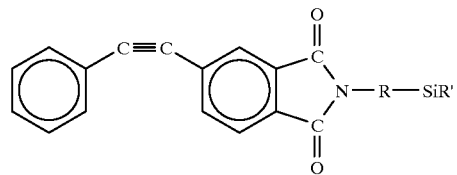

wherein R is aliphatic or aromatic having from 1 to about 15 carbon atoms and wherein R' comprises a hydrolyzable alkoxy functionality, and wherein the composition is introduced to the surface in the presence of sufficient water to hydrolyze the ethoxy groups.

2. A method for treating a metal surface as defined in claim 1 wherein the metal surface comprises titanium or a titanium alloy.

3. A method for treating a metal surface as defined in claim 1 wherein the metal surface comprises steel or a steel alloy.

4. A method for treating a metal surface as defined in claim 1 wherein the composition is dissolved to form an aqueous solution prior to applying the composition to the surface.

5. A method for treating a metal surface as defined in claim 1 wherein R comprises 3 carbon atoms.

6. A method for treating a metal surface as defined in claim 1 wherein the composition comprises 3-(4-phenylethynyl phthalimide) propyl triethoxy silane.

7. A method for treating a metal surface as defined in claim 1 wherein R is aliphatic or aromatic having from 2 to 8 carbon atoms.

8. A method for treating a metal surface as defined in claim 1 wherein R' is $(Oet)_3$.

9. A method for treating a metal surface as defined in claim 1 further comprising the step of applying a phenylethynyl terminated polyamide or polysulfide adhesive to the metal surface.

* * * * *